Patented May 28, 1946

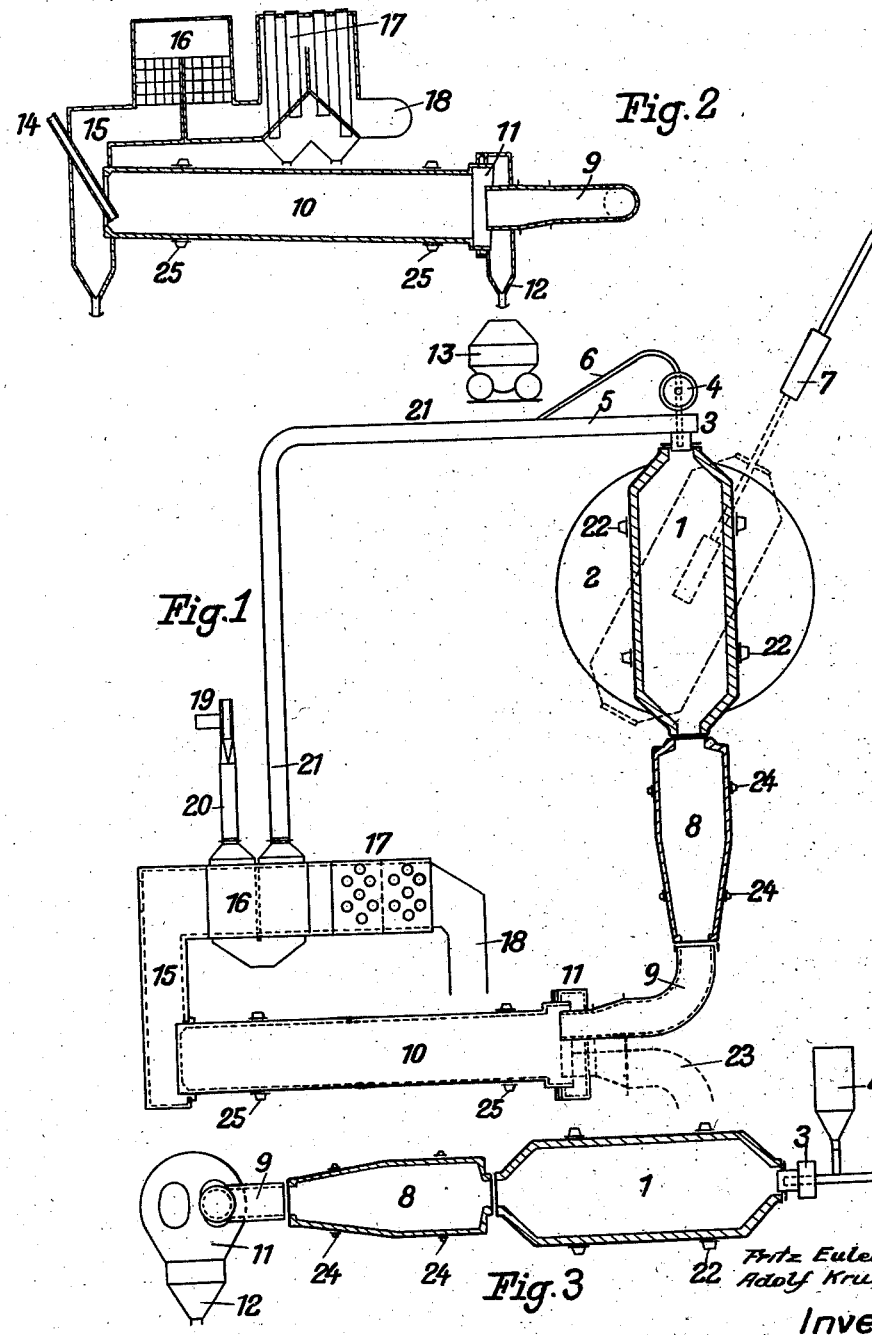

2,401,146

UNITED STATES PATENT OFFICE 2,401,146

PROCESS FOR PRODUCING IRON OR IRON ALLOYS

Fritz Eulenstein, Cologne-on-the-Rhine, and Adolf Krus, Sturzelberg uber Neuss II, Germany; vested in the Alien Property Custodian Application April 29, 1941, Serial No. 391,000
In Germany December 2, 1940

2 Claims. (Cl. 75—40)

This invention relates to a process and a device for producing iron or iron alloys by reducing iron ores in rotary drum furnaces operated by successive charges.

In the production of iron or iron alloys in furnaces of this class the charge comprising iron ores and reducing agents and possibly also additions like lime, etc., is directly heated by the hot furnace gases until the iron or iron alloys have been melted. As the gases flowing away from the furnace have still a very high temperature, their heat content has been utilized for preheating the ore or the charge in muffles or continuously operated cylindrical rotary kilns or for heating air heaters in which the air for combustion required for the operation of the reduction furnace is heated. The utilization of the waste gases of the reduction furnace involves, however, serious difficulties, since experience has shown that in all known devices utilizing the heat of such gases extensive accretions were formed or the brickwork melted away. This is due to the fact that the waste gases coming from a reduction furnace carry along dusty particles of the charge as well as ashes of the fuels used in firing the furnaces or volatilized portions of the charge. These substances, finely divided in the waste gases, enter into reaction with the masonry structure of the device connected with the furnace, so that either sintered or molten reaction products result, depending on circumstances.

According to the invention it has now been discovered that the said sintering or melting does not occur when the waste gases on coming out of the reduction furnace are first passed through an apparatus in which they serve for directly heating difficultly fusible substances like limestone, dolomite, magnesite, raw cement material to be burned, raw fireclay or similar refractory material, zinc oxide to be sintered, etc. After the temperature of the waste gases has in this way been materially reduced, for instance several hundred degrees, the gases, even if still containing considerable amounts of dust, may be used without hesitation for preheating the charge or the ore, or the air for combustion, in the usual apparatus, or may successively serve for both purposes and possibly also for heating the reducing agent if the latter is to be preheated separately from the ore and other constituents.

The devices in which the difficultly fusible substances are to be heated with the aid of the hot waste gases of the reduction furnace may have the form of rotary furnaces which either continually move in the same direction or are alternately revolved to and fro. Preferably, rotary furnaces operated by successive charges are employed, since it has been found that in a furnace of this type troublesome sintering or melting phenomena can best be avoided, even if in the reduction furnace ores are worked which produce easily fusible flue dust or from which during their reduction large quantities of volatile substances, as zinc oxides, lead oxides, etc., are driven out.

The furnace or heat exchanger for heating the difficultly fusible substances is preferably installed in the direction of the axis of the reduction furnace to permit the furnace gases to flow without shock through the reduction furnace and the connecting heat exchanger. In some instances it is advisable to construct this heat exchanger in such manner that its cross section decreases from the inlet to the outlet of the gases.

When lime, silica, alumina or similar substances or mixtures of substances are heated in the exchanger with the waste gases of the reduction furnace, they may subsequently in hot condition be brought into the reduction furnace if the operation of the latter requires such additions.

After their passage through the furnace serving for heating difficultly fusible substances, including on occasion also very difficultly fusible iron ores, the gases of the reduction furnace may be guided through an inclined rotary tube through which the ore, separately or together with one or more constituents of the charge or parts of such constituents, is led in parallel or counter-flow thereto. Subsequently, the gases may be utilized for heating the air supplied to the burner of the reduction furnace, or they may serve first for air heating and then for preheating the ore or charge. If their temperature is thereafter still high enough, they may be used in additional heat exchangers, for instance for preheating a reducing agent like coke, lean coal, etc., in case preheating of the reducing agent is to be carried out separately from preheating the ore, or for generating steam or the like.

It is further possible to preheat the difficultly fusible substances by the hot waste gases of the reduction furnace in an inclined continuous revolving tube or to arrange the utilization of their heat in such manner that first in the lowest part of such a revolving tube high-melting point substances and then in the upper part the ore either separately or together with other constituents of the charge are heated.

The ore or the charge and the air of combustion can be preheated also in other known devices.

If the constituents of the charge are not jointly but separately preheated, they are preferably mixed before they are introduced into the reduction furnace, for instance by simultaneously placing them in a bunker or charging vessel or by simultaneously feeding them to the furnace.

The invention is illustrated by way of example in the accompanying drawing, in which Figure 1 is a plan view of a furnace plant according to the invention;

Fig. 2 an elevation thereof; and

Fig. 3 a side elevation thereof.

1 denotes a rotary furnace in which iron ores, nickel ores, copper ores, etc., are reduced and which rotates in known manner on two rings 22 in corresponding bearings on a turntable 2, so that the two front sides of the furnace 1 can alternately be brought near the burner 3 as required. In the embodiment shown the burner is assumed to be a pulverized-coal burner, the powdered coal flowing from a bunker 4 into a piping 6 through which by primary air passing therethrough, it is forced into the burner 3 and then into the furnace. Secondary air enters through a piping 5. The furnace 1 can be charged in known manner either in inclined position from an elevated bunker, bucket etc. or in horizontal position by a charging device.

The waste gases coming from the furnace 1 and having a temperature of approximately 1300 to 1400° C. enter a drum 8 in which difficultly fusible substances are heated which at the waste gas temperature do not appreciably melt or slag. For example, limestone is heated and burnt in the drum 8. Between the drum 8 and the furnace 1 no sealing is required, and a gap may be left, particularly when the waste gases of the reduction furnace 1 still contain combustible constituents, through which due to the furnace draft false air is drawn in which serves for burning the combustible constituents. The limestone or other material is preferably fed in charges to the drum 8 from a superposed bunker through openings in the shell or front sides of the drum, which approximately correspond to large tapholes or through openings in the front side of the drum. Through these openings also the dead-burnt lime may be discharged.

From the drum 8 the waste gases cooled down to about 1000° C. or lower pass through a pipe or bend 9 to a furnace 10 having an enlarged zone 11, the bend 9 terminating preferably in the zone 11 or at a still farther point inside the drum or rotary furnace 10 which operates continuously. In the furnace 10 the ores to be reduced are first dried and then highly preheated, whereupon they pass through an intermediate bunker 12 into a charging car 13 disposed below which conveys the preheated ore to the furnace 1.

The ore is fed to the furnace 10 by means of an inlet pipe 14. From the rotary furnace 10 the waste gases having now a temperature of about 700-800° C. flow through a flue 15 into an air heater, e. g. a metal recuperator 16, and from the latter into a drier 17 for the reduction material. A piping 18 leads the waste gases cooled down to approximately 200-300° C. into the stack or, if the ores contain volatilizable metals, into a filter and then into the stack. The air required for combustion is forced into the recuperator 16 by a ventilator 19 and a cold air conduit 20 and through the hot air conduit 21 enters in preheated condition the two pipings 5, 6.

The heated lime in the furnace 8 is also discharged into the car 13, and likewise the reduction material in the preheater 10. The allotted quantities are accurately weighed and constitute the charges for the reduction furnace 1 to which they are fed either directly or through an intermediate bunker.

The preheating furnace 10 and connecting apparatus may be so dimensioned as to connect therewith a second or more iron reduction furnaces, as indicated in the drawing by the dotted gas conduit 23 which would then correspond approximately to the bend 9, so that between it and the associated reduction furnace a drum 8 would be interposed. 24, 25 are the rings of the furnaces 8, 10 which may be arranged and rotated in known manner.

The mode of operation is by way of example as follows:

After the furnace 1 has been charged with, say, highly preheated ore and limestone as well as with perfectly dried and preheated reducing material the burner 3 is started. At the beginning of the process the furnace 1 rotates slowly, but after some fritting of the fine ore particles occurs it may be rotated more quickly. As the waste gas temperatures are at first not particularly high, it is advisable to charge the furnace 8 later on, it being not necessary in this respect to make the duration of the treatment of the material in the furnace 8 coincide with that in the furnace 1. The furnace 8, independently of the furnace 1, may be discharged and charged during operation not only once but several times if necessary.

The charge for the rotary furnace 10 depends above all upon the quantity of the iron ore worked in the furnace 1 or, if two or more reduction furnaces work with the furnace 10, upon the amount of material smelted in the connected reduction furnaces. The recuperator 16 can be so amply dimensioned as to be capable of preheating the air of combustion for two or more furnaces, and the same applies to the drier 17 for the reducing material. The capacity of the drier 17 may be chosen at will, and the discharge of the dried and preheated material therefrom may take place independently of the operation of the furnace 1. Preheated ore, hot burnt limestone or reduction coal, or two or all of these substances may be additionally fed to the reduction furnaces during the duration of the charge.

The speed of the furnace 8 also depends on the nature of the operation and is for instance extremely low during deacidification of limestone, when it amounts f. i. only to a quarter turn in six minutes.

The reduction furnace 1 may be provided with a basic, neutral or acid lining, and the lining of the drums 8 and 10 should also be adapted to the work done therein. With respect to the furnaces 8, 10 plain refractory material like fireclay will as a rule be sufficient, since the wear is very low and the cooling due to the material to be treated in the furnaces protects the lining in excellent manner. As the waste gases come out of the furnace 8 at a temperature of about 1,000° C., the connecting piping or the bend 9 is subjected only to slight stressing. Instead of iron ores other ores of high-melting point metals, as oxidic nickel ores or copper ores or corresponding metallurgical products or waste, etc., may be treated in the reduction furnace.

What is claimed is:

1. Process of extracting iron or iron alloys, consisting in heating material containing iron mixed with reducing carbon in successive charges in a rotary furnace by direct action of furnace gases until the iron or iron alloys are melted, employing in a second furnace containing limestone the gases flowing out of the reduction furnace to heat the limestone in the second furnace, and then using these gases for heating the iron-containing material to be treated in the reduction furnace and feeding the preheated ore, limestone and reducing material into the reduction furnace.

2. Process of extracting iron or iron alloys, consisting in heating material containing iron mixed with reduction carbon in successive charges in a rotary furnace by the direct action of furnace gases until the iron or iron alloys are melted, employing in a second furnace containing limestone the gases flowing out of the reduction furnace to heat the limestone in the second furnace and feeding the heated limestone mixed with iron containing material and reduction carbon to the reduction furnace, which iron containing material and reduction carbon prior to their introduction into the reduction furnace have been heated by the gases flowing off from the second furnace.

FRITZ EULENSTEIN.
ADOLF KRUS.